United States Patent
Lee et al.

(10) Patent No.: US 8,743,979 B2
(45) Date of Patent: Jun. 3, 2014

(54) METHOD FOR PRECODING AND DECODING DISTRIBUTING MIMO CHANNELS IN RELAY-BASED DF COOPERATIVE WIRELESS NETWORKS

(75) Inventors: Moon Ho Lee, Jeollabuk-do (KR); Mustafa M. Matalgah, University, MS (US); Wei Song, Dan Dong (CN)

(73) Assignee: Industrial Cooperation Foundation Chonbuk National University, Jeollabuk-do (KR)

( * ) Notice: Subject to any disclaimer, the term of this patent is extended or adjusted under 35 U.S.C. 154(b) by 257 days.

(21) Appl. No.: 12/953,534

(22) Filed: Nov. 24, 2010

(65) Prior Publication Data
US 2012/0008702 A1 Jan. 12, 2012

(30) Foreign Application Priority Data
Jul. 12, 2010 (KR) .................. 10-2010-0066752

(51) Int. Cl.
H04L 27/28 (2006.01)

(52) U.S. Cl.
USPC ........... 375/260; 375/259; 375/219; 375/316; 375/295

(58) Field of Classification Search
USPC .......................... 375/260, 259, 219, 316, 295
See application file for complete search history.

(56) References Cited

U.S. PATENT DOCUMENTS

| | | | | |
|---|---|---|---|---|
| 6,859,503 B2* | 2/2005 | Pautler et al. | ................. | 375/299 |
| 8,000,401 B2* | 8/2011 | Lee et al. | ..................... | 375/260 |
| 8,116,399 B2* | 2/2012 | Gan et al. | ..................... | 375/267 |
| 8,126,033 B2* | 2/2012 | Jung et al. | ..................... | 375/211 |
| 2005/0243942 A1* | 11/2005 | Sawai | ............................. | 375/267 |
| 2006/0171294 A1* | 8/2006 | Son et al. | ..................... | 370/208 |
| 2006/0171444 A1* | 8/2006 | Lee et al. | ....................... | 375/130 |
| 2006/0281422 A1* | 12/2006 | Pan et al. | ................... | 455/127.1 |
| 2007/0058746 A1* | 3/2007 | Gueguen | ....................... | 375/267 |
| 2008/0108310 A1* | 5/2008 | Tong et al. | ..................... | 455/69 |
| 2010/0061438 A1* | 3/2010 | Tan et al. | ........................ | 375/227 |
| 2010/0067362 A1* | 3/2010 | Sakaguchi et al. | ............ | 370/203 |
| 2010/0195751 A1* | 8/2010 | Orlik et al. | ..................... | 375/267 |
| 2011/0149835 A1* | 6/2011 | Shimada et al. | .............. | 370/315 |

FOREIGN PATENT DOCUMENTS

| | | |
|---|---|---|
| KR | 1020080048584 | 6/2008 |
| KR | 1020090060534 | 7/2009 |

OTHER PUBLICATIONS

M. H. Lee, X.-D. Zhang, and W. Song, "A note on eigenvlaue decomposition on Jacket transform," in Proc. IET Conf. Wirel., Mobile, Sensor Netw. (CCWMSN), Dec. 12-14, 2007, pp. 987-990.*
W. Song, M. H. Lee, and G. Zeng, "Orthogonal space-time block codes design using Jacket transform for MIMO transmission system," in Proc. IEEE Int. Conf. Commun., May 2008, pp. 766-769.*
G. H. Zeng and M. H. Lee, "A generalized reverse block Jacket transform," IEEE Trans. Circuits Syst. I, Reg. Papers, vol. 55, No. 6, pp. 1589-1600, Jul. 2008.*

(Continued)

*Primary Examiner* — Kenneth Lam
(74) *Attorney, Agent, or Firm* — Ohlandt, Greeley, Ruggiero & Perle, LLP

(57) ABSTRACT

It is well known that relay-based DF cooperative wireless networks outperform AF cooperative networks. However, this performance enhancement is achievable through considerable signal processing (precoding/decoding) at relay nodes. To reduce the precoding/decoding complexity, a method for precoding and decoding a distributive MIMO channel in the relay-based DF cooperative wireless network using EVD based on properties of Jacket transformations is provided.

8 Claims, 2 Drawing Sheets

(56) References Cited

OTHER PUBLICATIONS

Figure 1:
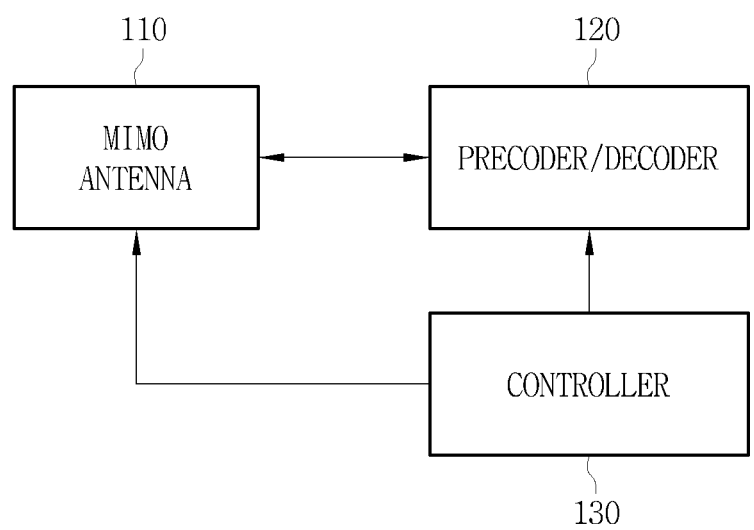

M.H. Lee, M.M. Matalgah, W. Song "Fast Method for Precoding and Decoding of Distributive Multi-Input Multi-Output Channels in Replay-Based Decode-and-Forward Cooperative Wireless Networks", IET Commun., 2010, vol. 4, Iss. 2, pp. 144-153.

M.H. Lee, M.M. Matalgah, W. Song "Fast Method for Precoding and Decoding of Distributive Multi-Input Multi-Output Channels in Replay-Based Decode-and-Forward Cooperative Wireless Networks", IET Commun., Jan. 22, 2010—vol. 4, Issue 2, Abstract.
Office Action in Related Korean Application.
English Abstract of KR1020080048584.
English Abstract of KR1020090060534.

* cited by examiner

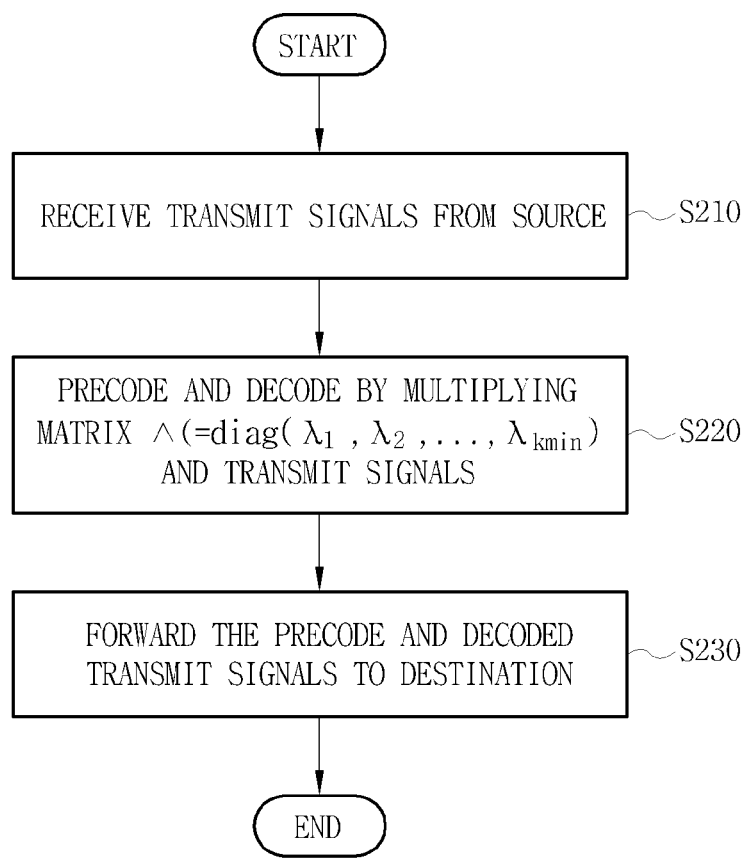

METHOD FOR PRECODING AND DECODING DISTRIBUTING MIMO CHANNELS IN RELAY-BASED DF COOPERATIVE WIRELESS NETWORKS

CROSS-REFERENCE TO RELATED APPLICATION

This application claims priority to and the benefit of Korean Patent Application No. 10-2010-0066752 filed on Jul. 12, 2010 in the Korean Intellectual Property Office, the entire contents of which are incorporated herein by reference.

TECHNICAL FIELD OF THE INVENTION

The present invention relates generally to a wireless network. More particularly, the present invention relates to a relay-based Decode-and-Forward (DF) cooperative wireless network.

BACKGROUND OF THE INVENTION

Relay-based cooperative wireless networks are wireless networks which deliver information from a source node to a destination node via relay nodes.

To relay the information in the relay-based cooperative wireless network, the relay node adopts an Amplify-and-Forward (AF) scheme and a Decode-and-Forward (DF) scheme.

The former scheme simply amplifies and forwards a received signal to the destination, and thus features its simple procedure. However, noise is accumulated during the relay and the accumulated noise is amplified at the relay node.

The latter scheme obviously outperforms the AF scheme, without suffering from the problems of the AF scheme. However, as more signal processing is added to the information relay at each relay node, shortcomings including computational complexity and information delivery delay are caused.

SUMMARY OF THE INVENTION

To address the above-discussed deficiencies of the prior art, it is a primary aspect of the present invention to provide a precoding and decoding method for allowing fast information delivery by reducing computational complexity for information relay in a relay-based DF cooperative wireless network.

According to one aspect of the present invention, a communication method in a wireless network includes receiving transmit signals from a source; precoding and decoding the transmit signals; and forwarding the precoded and decoded transmit signals to a destination. The precoding and decoding operation may precode and decode the transmit signals by multiplying a matrix A and the transmit signals, the matrix $\Lambda$ may be a diagonal matrix in which eigenvalues of a matrix $HH^H$ are in the diagonal, H may be a channel matrix, and $H^H$ may be a transpose conjugate matrix of H.

$\Lambda=\mathrm{diag}(\lambda_1, \lambda_2, \ldots, \lambda_{K_{min}})$, diag( ) denotes a diagonal matrix, $\lambda_i$ denotes an i-th ($i=1,2, \ldots, K_{min}$) eigenvalue of a Wishart matrix $HH^H$, $K_{min}=\min\{n_T, n_R\}$, $n_T$ denotes the number of transmit antennas, and $n_R$ denote the number of receive antennas.

The channel matrix H may be expressed in a Singular-Value Decomposition (SVD) form such as $H=U\Lambda V^H$, $U \in C^{n_R \times K_{min}}$ (C denotes a complex field) may be satisfied, and $V^H \in C^{K_{min} \times n_T}$ may denote unitary matrices.

The precoding and decoding may be operations for decomposing a Multiple Input Multiple Output (MIMO) channel into $K_{min}$-ary non-interfering Single-Input Single-Output (SISO) channels.

The wireless network may be a distributive MIMO cooperative wireless network.

According to another aspect of the present invention, a relay node in a wireless network includes an antenna for transmitting and receiving transmit signals to and from a source; and a precoder/decoder for precoding and decoding the transmit signals received via the antenna, and forwarding the precoded and decoded transmit signals to a destination via the antenna. The precoder and decoder may precode and decode the transmit signals by multiplying a matrix $\Lambda$ and the transmit signals, the matrix $\Lambda$ may be a diagonal matrix in which eigenvalues of a matrix $HH^H$ are in the diagonal, H may be a channel matrix, and $H^H$ may be a transpose conjugate matrix of H.

$\Lambda=\mathrm{diag}(\lambda_1, \lambda_2, \ldots, \lambda_{K_{min}}, )$, where diag( ) denotes a diagonal matrix, $\lambda_i$ denotes an i-th ($i=1,2, \ldots, K_{min}$) eigenvalue of a Wishart matrix $HH^H$, $K_{min}=\min\{n_T n_R\}$, $n_T$ denotes the number of transmit antennas, and $n_R$ denote the number of receive antennas.

The channel matrix H may be expressed in a SVD form such as $H=U\Lambda V^H$, $U \in C^{n_R \times K_{min}}$ (C denotes a complex field) may be satisfied, and $V^H \in C^{K_{min} \times n_T}$ may denote unitary matrices.

The precoding and decoding may be operations for decomposing a MIMO channel into $K_{min}$-ary non-interfering SISO channels.

The wireless network may be a distributive MIMO cooperative wireless network.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 is a block diagram of a relay node (device) constituting a relay-based DF cooperative wireless network according to an exemplary embodiment of the present invention; and FIG. 2 is a flowchart of a signal relay method at the relay node of FIG. 1.

Throughout the drawings, like reference numerals will be understood to refer to like parts, components and structures.

DETAILED DESCRIPTION OF THE INVENTION

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

1. Jacket Matrix

Hadamard matrices and Hadamard transforms have been applied to communications, image processing, signal representation, and error correction. As for the Hadamard matrix, $|\det H_n| = n^{n/2}$.

Definition 1:

$A(=a_{jk})$ denotes an n×n matrix of which elements are in a field F. Herein, the field F includes real fields, complex fields, finite fields, and so on. $A^+$ is a transpose matrix of an element-wise inverse matrix of A. That is, $A^+ = a_{kj}^{-1}$.

When $AA^+ = A^+A = nI_n$, A is called a Jacket matrix, where $I_n$ denotes the identity matrix over the field F.

For example, when a matrix A and its element-wise inverse transpose $A^+$ are given by the following Equation 1, A is a 2×2 Jacket matrix.

$$A = \begin{bmatrix} a & \sqrt{ac} \\ \sqrt{ac} & -c \end{bmatrix}, A^+ = \begin{bmatrix} \frac{1}{a} & \frac{1}{\sqrt{ac}} \\ \frac{1}{\sqrt{ac}} & -\frac{1}{c} \end{bmatrix} \quad (1)$$

In a special case with a=c=1, A becomes a 2×2 Hadamard matrix.

From the definition of the Jacket matrix, it is easy to notice that the Jacket matrices include complex Hadamard matrices as a special case. On the other hands, centre weighted Hadamard matrix W is defined as Equation 2 and Equation 3.

$$W_4 = \begin{bmatrix} 1 & 1 & 1 & 1 \\ 1 & -\omega & \omega & -1 \\ 1 & \omega & -\omega & -1 \\ 1 & -1 & -1 & 1 \end{bmatrix} \quad (2)$$

$$W_4^+ = \begin{bmatrix} 1 & 1 & 1 & 1 \\ 1 & -\frac{1}{\omega} & \frac{1}{\omega} & -1 \\ 1 & \frac{1}{\omega} & -\frac{1}{\omega} & -1 \\ 1 & -1 & -1 & 1 \end{bmatrix} \quad (3)$$

W satisfies Equation 4.

$$W_{2n} = W_n \otimes H_2 \quad (4)$$

$$H_2 = \begin{bmatrix} 1 & 1 \\ 1 & -1 \end{bmatrix} \quad (5)$$

In Equation 5, $H_2$ denotes the 2×2 Hadamard matrix, n=4k (k is an integer), and ⊗ denotes the Kronecker product. In Equation (2) and Equation (3), ω denotes an arbitrary weighting factor.

By a simple calculation, $W_4 W_4^+ = 4I_4$. Hence, $W_4$ corresponds to a Jacket matrix. In particular, when ω=1, $W_4$ corresponds to the Hadamard matrix. When ω=2, $W_4$ corresponds to the centre weighted Hadamard matrix.

There exists a permutation matrix P satisfying $PW_{2n}P^T = P(W_n \otimes H_2)P^T = H_2 \otimes W_n$, where $P^T$ is the transpose matrix of P. That is, there exists the matrix P meeting the following Equation 6.

$$\begin{aligned} W_{2n}W_{2n}^+ &= P^T(H_2 \otimes W_n)PP^T(H_2 \otimes W_n)P \\ &= P^T \begin{bmatrix} W_n & W_n \\ W_n & -W_n \end{bmatrix} \begin{bmatrix} W_n & W_n \\ W_n & -W_n \end{bmatrix}^+ P \\ &= 2nI_{2n} \end{aligned} \quad (6)$$

Thus, the centre weighted Hadamard matrix also corresponds to the Jacket matrix. An orthogonal Jacket matrix can be applied to various fields such as Multiple Input Multiple Output (MIMO) encoding for mobile communication, orthogonal code design, and mobile communication.

Two types of space-time block codes can be used to generate redundant signals transmitted from multiple antennas. One is complex orthogonal codes, and the other is complex quasi-orthogonal codes. Unlike the space-time codes with the limited number of antennas, the complex quasi-orthogonal codes are the space-time codes without the limitation on the number of the antennas.

The space-time block codes combine trellis-coded modulation and space-time diversity, which works well in slowly fading environments. The space-time codes are based on an Alamouti orthogonal matrix.

$$A(x_1, x_2) = \begin{bmatrix} x_1 & x_2 \\ -x_2^* & x_1^* \end{bmatrix} \quad (7)$$

$x_i^*$ denotes conjugate of $x_i$. Since the rate is 1, the code matrix is optimal for transmitting signals in the complex modulation over two independent fading channels. Properties of these matrices ensure full diversity equal to the number of the antennas and linear maximal likelihood detection.

When the number of the antennas is two or three, an extract density function of the capacity can be obtained using Jacobian transformation.

Definition 2:

It is assumed that A is an n×n matrix. When there is a Jacket matrix J meeting $A = JDJ^{-1}$, where D is a diagonal matrix, A is defined as the Jacket matrix similar to the diagonal matrix D. When A is the Jacket matrix similar to the diagonal matrix D, main diagonal entries of D are all eigenvalues. Further, since $A = JDJ^{-1}$, $D = J^{-1}DJ$. When J is the Jacket matrix, it is easy to obtain the inverse of J as $J_{n \times n}^{-1} = (1/n)H_{n \times n}^+$. Hence, based on $D = (1/n)J^+AJ$, the eigenvalues of A can be calculated with easy.

2. Jacket Matrix Eigen Value Decomposition (EVD)

Hereafter, EVD using the Jacket matrix is explained in detail.

2.1. Jacket Matrix of Order 2

When the 2×2 matrix A is given by Equation 8, it is the Jacket matrix. The Jacket matrix is similar to the diagonal matrix. Note that all of entries excluding the main diagonal entries in the diagonal matrix are zero.

$$A = \begin{bmatrix} a & b \\ c & a \end{bmatrix} \quad (8)$$

The entries of the main diagonal of the Jacket matrix are equal. In particular, the matrix A can be expressed as an EVD form by the symmetric Jacket matrix J as expressed in Equation 9.

$$\begin{bmatrix} a & b \\ c & a \end{bmatrix} = \begin{bmatrix} b & -\sqrt{bc} \\ -\sqrt{bc} & -c \end{bmatrix} \begin{bmatrix} a \pm \sqrt{bc} & 0 \\ 0 & a \mp \sqrt{bc} \end{bmatrix} \times \begin{bmatrix} b & -\sqrt{bc} \\ -\sqrt{bc} & -c \end{bmatrix}^{-1} \quad (9)$$

2.2 Jacket Matrix of Order 3

Matrices of order 3 which can be factorized to the EVD form through the Jacket matrices are described.

When a 3×3 matrix A can be factorized to an EVD form $A = JLJ^{-1}$, A is the Jacket matrix similar to the diagonal matrix. It is assumed that, in the matrix A, the elements of the first row are arbitrary and the elements of any other rows are generated through a cyclic shift of the previous row. The matrix A is given by Equation 10.

$$A = \begin{bmatrix} a & b & c \\ c & a & b \\ b & c & a \end{bmatrix} \quad (10)$$

The matrix A is decomposed to Equation 11.

$$\begin{bmatrix} a & b & c \\ c & a & b \\ b & c & a \end{bmatrix} = \begin{bmatrix} 1 & 1 & 1 \\ 1 & \omega & \omega^2 \\ 1 & \omega^2 & \omega \end{bmatrix} \times \begin{bmatrix} a+b+c & 0 & 0 \\ 0 & a+b\omega+c\omega^2 & 0 \\ 0 & 0 & a+b\omega^2+c\omega \end{bmatrix} \times \begin{bmatrix} 1 & 1 & 1 \\ 1 & \omega & \omega^2 \\ 1 & \omega^2 & \omega \end{bmatrix}^{-1} \quad (11)$$

In Equation 11, $\omega = e^{-u\pi/n}$ (n denotes the matrix order), $\omega^3 = 1$, and $\omega^1 \neq 1$.

2.3 Jacket Matrix of Order n

Construction of the EVD of the n-order matrix using the Kronecker product is elucidated. Herein, $n = 2^k \times 3^l$, where k and l denote integers. The order of the matrix is assumed to be 6 (k=l=1). To construct this matrix, a second-order matrix and a third-order matrix which are both Jacket matrix eigenvalue decomposable, are required.

The second-order matrix $A_2$ is assumed to be Jacket matrix eigenvalue decomposable ($A_2 = J_2 \Lambda_2 J_2^{-1}$) via a Jacket matrix $J_2$ as expressed in Equation 12.

$$\begin{bmatrix} a & b \\ b & a \end{bmatrix} = \begin{bmatrix} a & a \\ a & -a \end{bmatrix} \begin{bmatrix} a+b & 0 \\ 0 & a-b \end{bmatrix} \begin{bmatrix} a & a \\ a & -a \end{bmatrix}^{-1} \quad (12)$$

The third-order matrix $A_3$ is assumed to be Jacket matrix eigenvalue decomposable ($A_3 = J_3 \Lambda_3 J_3^{-1}$) via a Jacket matrix $J_3$ as expressed in Equation 13.

$$\begin{bmatrix} a & b & c \\ c & a & b \\ b & c & a \end{bmatrix} = \begin{bmatrix} 1 & 1 & 1 \\ 1 & \omega & \omega^2 \\ 1 & \omega^2 & \omega \end{bmatrix} \times \begin{bmatrix} a+b+c & 0 & 0 \\ 0 & a+b\omega+c\omega^2 & 0 \\ 0 & 0 & a+b\omega^2+c\omega \end{bmatrix} \times \begin{bmatrix} 1 & 1 & 1 \\ 1 & \omega & \omega^2 \\ 1 & \omega^2 & \omega \end{bmatrix}^{-1} \quad (13)$$

In result, a matrix $A_6$ eigenvalue decomposable via the Jacket matrices can be constructed as expressed in Equation 14.

$$A_6 = A_2 \otimes A_3 = (J_2 \otimes J_3)(\Lambda_2 \otimes \Lambda_3)(J_2 \otimes J_3)^{-1} \quad (14)$$

In Equation 14, $\otimes$ denotes the Kronecker product. The EVD in Equation 14 is given by Equation 15.

$$A_6 = \begin{bmatrix} a & b \\ b & a \end{bmatrix} \otimes \begin{bmatrix} a & b & c \\ c & a & b \\ b & c & a \end{bmatrix} \quad (15)$$

$$= \left[ \begin{bmatrix} a & a \\ a & -a \end{bmatrix} \otimes \begin{bmatrix} 1 & 1 & 1 \\ 1 & \omega & \omega^2 \\ 1 & \omega^2 & \omega \end{bmatrix} \right] \times$$

$$\left[ \begin{bmatrix} a+b & 0 \\ 0 & a-b \end{bmatrix} \otimes \begin{bmatrix} a+b+c & 0 & 0 \\ 0 & a+b\omega+c\omega^2 & 0 \\ 0 & 0 & a+b\omega^2+c\omega \end{bmatrix} \right] \times$$

$$\left[ \begin{bmatrix} a & a \\ a & -a \end{bmatrix} \otimes \begin{bmatrix} 1 & 1 & 1 \\ 1 & \omega & \omega^2 \\ 1 & \omega^2 & \omega \end{bmatrix} \right]^{-1}$$

To generalize, it is assumed that $A_{p^m}$ (m=2,3) is decomposable to $A_{p^m} = J_{p^m}^{-1} \Lambda_{p^m} J_{p^m}$ via the Jacket matrix $J_{p^m}$. By means of the Kronecker product properties, Equation 16 is established.

$$A_{p^m} = A_{p^{m-1}} \otimes A_p = \underbrace{A_p \otimes A_p \otimes \ldots \otimes A_p}_{m \text{ terms}} \doteq A_p^{\otimes m} \quad (16)$$

Similarly, $J_{p^m} = J_{p^{m-1}} \otimes J_p = J_p^{\otimes m}$ and $\Lambda_{p^m} = \Lambda_{p^{m-1}} \otimes \Lambda_p = \Lambda_p^{\otimes m}$. Hence, in general, n ($= 2^k \times 3^l$)-th order matrix can be decomposed via the Jacket transformation as expressed in Equation 17.

$$A_n = A_{2^k \times 3^l} \quad (17)$$

$$= A_{2^k} \otimes A_{3^l} = \left( J_{2^k} \Lambda_{2^k} J_{2^k}^{-1} \right) \otimes \left( J_{3^l} \Lambda_{3^l} J_{3^l}^{-1} \right)$$

$$= (J_{2^k} \otimes J_{3^l})(\Lambda_{2^k} \otimes \Lambda_{3^l})(J_{2^k} \otimes J_{3^l})^{-1}$$

3. Application in Distributive MIMO Cooperative Wireless Networks

3.1 MIMO System Model

In a MIMO system, input and output relations can be modeled as Equation 18.

$$y = Hx + n \quad (18)$$

In Equation 18, x denotes an $n_T \times 1$ transmit signal vector ($n_T$ is the number of transmit antennas), y denotes an $n_R \times 1$ receive signal vector ($n_R$ is the number of receive antennas), H denotes an $n_R \times n_T$ channel gain matrix, and n denotes an $n_R \times 1$ white Gaussian noise vector. The channel matrix H is given by Equation 19.

$$H = \begin{bmatrix} h_{1,1} & h_{1,2} & \cdots & h_{1,n_T} \\ h_{2,1} & h_{2,2} & \cdots & h_{2,n_T} \\ \vdots & \vdots & \vdots & \vdots \\ h_{n_R,1} & \cdots & \cdots & h_{n_R,n_T} \end{bmatrix} \quad (19)$$

In Equation 19, $h_{i,j}$ denotes the gain of the radio channel between the j-th transmit antenna and the i-th receive antenna.

3.2 Capacity of MIMO Wireless Systems

The capacity of the MIMO system depends on the distribution of $\{h_{i,j}\}$ in the channel matrix H. Each transmit antenna assumes to transmit an average power $P/n_T$, where P denotes the total transmit power given by $E[x^H X]$, E denotes the statistical expectation, and $^H$ denotes the transpose conjugate or Hermitian.

The instantaneous capacity of a wireless MIMO communication system is given by Equation 20.

$$C = \log_2 \left[ \det \left( I_{n_R} + \frac{\rho}{n_T} HH^H \right) \right] \text{ bits/s/Hz} \quad (20)$$

In Equation 20, $\rho$ denotes an average signal-to-noise ratio per receive antenna, and $I_{n_R}$ denotes $n_R \times n_R$ identity matrix. The matrix $HH^H$ or $H^H H$, which is a random Non-Negative Definite (NND) matrix, has real, non-negative, and non-zero eigenvalue vector $\Lambda = \text{diag}(\lambda_1, \lambda_2, \ldots, \lambda_{K_{min}})$, where $K_{min} = \min\{n_T, n_R\}$ and $n_T$ and $n_R$ denote the number of the transmit antennas and the receive antennas respectively. The capacity of the MIMO system is given by Equation 21.

$$C = \sum_{i=1}^{k} \log_2 \left( 1 + \frac{\rho}{n_T} \lambda_i \right) \text{ bits/s/Hz} \quad (21)$$

In Equation 21, $\lambda_i$ denotes the i-th eigenvalue of the Wishart matrix $HH^H$. The MIMO channel matrix H randomly varies according to the fading channel statistics, which causes a random behavior of the eigenvalue vector L and thus leads to a random behavior of the capacity as expressed in Equation 21.

3.3 MIMO Precoding and Decoding Based on EVD

When a frequency-selective MIMO channel is converted to a plurality of parallel flat fading MIMO subchannels using linear precoding/decoding based on the EVD, the MIMO transmission and reception can be performed per subcarrier. The linear precoding/decoding requires full Channel State Information (CSI) at the transmitter and the receiver.

On the assumption of perfect CSI estimation of H, optimal precoder and decoder matrix transformation can partition the MIMO channel into $K_{min}$-ary non-interfering parallel flat fading Single-Input Single-Output (SISO) subchannels, where $K_{min}$ is defined above.

The channel matrix H can be expressed as a Singular-Value Decomposition (SVD) form of Equation 22.

$$H = U \Lambda V^H \quad (22)$$

In Equation 22, $U \in C^{n_R \times K_{min}}$ (C denotes the complex field) and $V^H \in C^{K_{min} \times n_T}$ denote unitary matrices. $V^H$ denotes the Hermitian transpose conjugate matrix of V. $\Lambda \in C^{K_{min} \times K_{min}}$ denotes a diagonal matrix including the singular values of H.

Thus, the concept of the SVD channel precoding/decoding is given by the following matrix transformations of Equation 23.

$$U^H H V = U^H U \Lambda V^H V = \Lambda \quad (23)$$

When X is $K_{min}$-ary symbols to transmit over the MIMO channel, received symbols Y after the precoding and the decoding are given by Equation 24.

$$Y = (U^H)(H)(VX) + (U^H)n = \Lambda X + n' \quad (24)$$

In Equation 24, $X = [X_1, X_2, \ldots, X_{K_{min}}]^T$ and $Y = [Y_1, Y_2, \ldots Y_{K_{min}}]^T$. n' $(= U^H n)$ denotes white Gaussian Noise vector.

As a result of the transmit precoding and receive decoding process, it is clear that each channel matrix H is decomposed into $K_{min}$-ary uncorrelated parallel SISO subchannels. Accordingly, the received symbol vector in terms of the transmit signal vector over the precoding/decoding channel is expressed as the matrix in Equation 25.

$$\begin{bmatrix} Y_1 \\ Y_2 \\ \vdots \\ Y_{K_{min}} \end{bmatrix} = \begin{bmatrix} \Lambda_1 & 0 & \cdots & 0 \\ 0 & \Lambda_1 & \cdots & 0 \\ \vdots & \vdots & \vdots & \vdots \\ 0 & 0 & \cdots & \Lambda_{K_{min}} \end{bmatrix} \begin{bmatrix} X_1 \\ X_2 \\ \vdots \\ X_{K_{min}} \end{bmatrix} + \begin{bmatrix} n'_1 \\ n'_2 \\ \vdots \\ n'_{K_{min}} \end{bmatrix} \quad (25)$$

In other words, this type of the MIMO precoding/decoding technique results in a link between the transmitter and the receiver, which is effectively associated only with a diagonal matrix L. Entries to this matrix are simply the singular values of the channel matrix H.

3.4 Present Channel Precoding/Decoding in Single-symbol Decodable STBC Distributive-MIMO DF Cooperative Communication Relay-based cooperative wireless network systems are classified into two types in terms of retransmission at the relay nodes. One is Amplify-and-Forward (AF) cooperative networks and the other is Decode-and-Forward (DF) cooperative networks.

In the first type, the signal received at the relay node is simply amplified and forwarded to the destination without any signal processing operations. Hence, the noise accumulated during the broadcast stage is amplified at the relay node and reaches the destination in addition to the noise resulted from the relay.

In the second type, the noisy signal received at the relay is first decoded before it is forwarded to the destination. The second type enables the relay node to forward a noise-free signal to the destination and thus only the noise accumulated at the relaying stage is the total noise which arrives at the destination. Clearly, the second type outperforms the first type, which draws more attention to the DF cooperative networks.

However, such performance is achieved at the expense of more signal processing (precoding and decoding) added at each relay node as discussed earlier.

Meanwhile, it is necessary to reduce the precoding/decoding complexity. The precoding/decoding complexity can be reduced by a fast method in terms of time computation. The performance of this method can be evaluated quantitatively through mathematical analysis and numerical results.

Hereafter, a distributed relay-based cooperative wireless network including a source, a destination, and N-relays is considered.

Transmission from the source to the destination is carried out in two phases including a broadcast phase and a relay phase.

In the broadcast phase, the source transmits STBC information symbols $x^{(i)}$ ($i=1,2,\ldots,N_{T_1}$) in a duration of $N_{T_1}$ time slots. All of the N-ary relays receive a faded and noise-added version of the $N_{T_1}$-ary symbols.

In the relay phase, assuming the DF transmission at the relays, all the N-ary relays perform distributed decoding and space-time block encoding on their decoded received vectors and transmit the encoded vectors in $N_{T_2}$ time slots.

When time allocations for the relay and broadcast phases are the same, the transmission is optimal. That is, when $N_{T_1}=N_{T_2}$, a receive SNR at the destination is maximized. Each relay transmits a column including $N_{T_2}$ entries of a distributed STBC matrix of $N_{T_2} \times N$ size. The destination receives a faded and noise-added matrix.

A problems lies in decoding the received STBC information symbols $x^{(i)}$ ($i=1,2,\ldots,N_{T_1}$) at the relays over the $N_{T_1}$ time slots. Assuming that maximum-likelihood decoding is single-symbol decoding at the relays, the received signal at the j-th (j=1,2,…,N) relay in the i-th (i=1,2,…,N) time slot is expressed as $y_j^{(i)}$.

$$y_j^{(i)} = \sqrt{E_1} h_{sj} x^{(i)} + n_j^{(i)} \tag{26}$$

In Equation 26, $h_{sj}$ denotes the complex channel gain from the source to the j-th relay, and $n_j^{(i)}$ denotes additive white Gaussian noise at the j-th relay. The white Gaussian noise has zero mean and unit variance. $E_1$ denotes a transmit energy per symbol in the broadcast phase, and $E\lfloor (x^{(i)})^* x^{(i)} \rfloor = 1$. A $2N_{T_1} \times 1$ real vector $y_j$ at the j-th relay is given by Equation 27.

$$y_j = [y_{jI}^{(1)}, y_{jQ}^{(1)}, y_{jI}^{(2)}, y_{jQ}^{(2)}, \ldots, y_{jI}^{(NT1)}, y_{jQ}^{(NT1)}]^T \tag{27}$$

In Equation 27, $y_{jI}^{(i)}$ and $y_{jQ}^{(i)}$ denote in-phase (real part) and quadrature (imaginary part) components of $y_j^{(i)}$. Equation 27 can be simplified to Equation 28.

$$y_j = \sqrt{E_1} H_{sj} x + n_j \tag{28}$$

x denotes the $2N_{T_1} \times 1$ data symbol real vector, which is given by Equation 29.

$$x = [x_I^{(1)}, x_Q^{(1)}, x_I^{(2)}, x_Q^{(2)}, \ldots, x_I^{(NT1)}, x_Q^{(NT1)}]^T \tag{29}$$

$n_j$ denotes the $2N_{T_1} \times 1$ noise vector, which is given by Equation 30.

$$n_j = [n_{jI}^{(1)}, n_{jQ}^{(1)}, n_{jI}^{(2)}, n_{jQ}^{(2)}, \ldots, n_{jI}^{(NT1)}, n_{jQ}^{(NT1)}]^T \tag{30}$$

$H_{sj}$ denotes a $2N_{T_1} \times 2N_{T_1}$ block-diagonal matrix, which is given by Equation 31.

$$H_{sj} = \begin{bmatrix} \begin{bmatrix} h_{sjI} & -h_{sjQ} \\ h_{sjQ} & h_{sjI} \end{bmatrix} & \cdots & 0 \\ \vdots & \ddots & \vdots \\ 0 & \cdots & \begin{bmatrix} h_{sjI} & -h_{sjQ} \\ h_{sjQ} & h_{sjI} \end{bmatrix} \end{bmatrix} \tag{31}$$

Herein, when $B_2$ denotes the 2×2 block matrix in the main diagonal of $H_{sj}$, Equation 31 can be written as Equation 32.

$$H_{sj} = I_{N_{T1}} \otimes B_2 \tag{32}$$

$B_2$ is given by Equation (33).

$$B_2 = \begin{bmatrix} h_{sjI} & -h_{sjQ} \\ h_{sjQ} & h_{sjI} \end{bmatrix} \tag{33}$$

$I_{N_{T1}}$ denotes an $N_{T_1} \times N_{T_1}$ identity matrix, and $\otimes$ denotes the Kronecker product. Each block in the diagonal of the matrix in Equation 31 is a 2×2 matrix which satisfies the condition of Equation 8. Thus, $B_2$ can be eigenvalue decomposed using the Jacket matrices. That is, $B_2$ can be expressed as Equation 34.

$$B_2 = J_2 \Lambda_2 J_2^{-1} \tag{34}$$

By applying Equation 9 to Equation 34, Equation 35 and Equation 36 are yielded.

$$J_2 = \begin{bmatrix} -h_{sjQ} & -jh_{sjQ} \\ -jh_{sjQ} & -h_{sjQ} \end{bmatrix} \tag{35}$$

$$\Lambda_2 = \begin{bmatrix} h_{sjI} \pm jh_{sjQ} & 0 \\ 0 & h_{sjI} \mp jh_{sjQ} \end{bmatrix} \tag{36}$$

Since any identity matrix is eigenvalue decomposable using the Jacket matrices, Equation 37 is written.

$$I_{NT1} = J_{NT1} \Lambda_{NT1} J_{NT1}^{-1} \tag{37}$$

All the matrices in Equation 37 are $N_{T_1} \times N_{T_1}$ identity matrices. Now, using Equation 14 and Equation 32, $H_{sj}$ can be diagonally decomposed as Equation 38.

$$H_{sj} = I_{N_{T_1}} \otimes B_2 = I_{N_{T_1}} \otimes (J_2 \Lambda_2 J_2^{-1}) \tag{38}$$
$$= (I_{N_{T_1}} \otimes J_2)(I_{N_{T_1}} \otimes \Lambda_2)(I_{N_{T_1}} \otimes J_2^{-1}) = J \Lambda J^{-1}$$

Thus, $H_{sj}$ is expressed as Equation 39, Equation 40, Equation 41, and Equation 42. Herein, the size of each block in the diagonal matrices of Equation 40, Equation 41, and Equation 42 is 2×2.

$$H_{sj} = J \Lambda J^{-1} \tag{39}$$

where $$J = I_{N_{T_1}} \otimes J_2 = \begin{bmatrix} J_2 & \cdots & 0 \\ \vdots & \ddots & \vdots \\ 0 & \cdots & J_2 \end{bmatrix}_{2N_{T_1} \times 2N_{T_1}} \tag{40}$$

-continued $$\Lambda = I_{N_{T_1}} \otimes \Lambda_2 = \begin{bmatrix} \Lambda_2 & \cdots & 0 \\ \vdots & \ddots & \vdots \\ 0 & \cdots & \Lambda_2 \end{bmatrix}_{2N_{T_1} \times 2N_{T_1}} \quad (41)$$

$$J^{-1} = I_{N_{T_1}} \otimes J_2^{-1} = \begin{bmatrix} J_2^{-1} & \cdots & 0 \\ \vdots & \ddots & \vdots \\ 0 & \cdots & J_2^{-1} \end{bmatrix}_{2N_{T_1} \times 2N_{T_1}} \quad (42)$$

4. Relay Node Constituting Wireless Network

FIG. 1 is a block diagram of the relay node (device) constituting the relay-based DF cooperative wireless network according to an exemplary embodiment of the present invention. The relay-based DF cooperative wireless network accomplishes the transmission using the single-symbol decodable space-time block codes.

The relay node, as shown in FIG. 1, includes an MIMO antenna 110, a precoder/decoder 120, and a controller 130.

The MIMO antenna 110 receives a signal from the source node or another relay node, and sends the signal to the destination node or other relay node.

The precoder/decoder 120 precodes and decodes the signal received via the MIMO antenna 110. The precoder/decoder 120 sends the precoded and decoded signal to the MIMO antenna 110.

The controller 130 controls the transmission and the reception of the MIMO antenna 110 and the precoding and the decoding of the precoder/decoder 120.

FIG. 2 is a flowchart of a signal relay method at the relay node of FIG. 1. As shown in FIG. 2, the MIMO antenna 110 of the relay node receives transmit signals from the source (S210).

The precoder/decoder 120 precodes and decodes the transmit signals received in S210 (S220). The precoding and the decoding decompose the MIMO channel into the $K_{min}$-ary non-interfering SISO channels, and are carried out by multiplying the matrix $\Lambda$ and the transmit signals as stated above.

Herein, $\Lambda = \text{diag}(\lambda_1, \lambda_2, \ldots, \lambda_{K_{min}})$, where $\lambda_i$ denotes the i-th ($i=1,2,\ldots,K_{min}$) eigenvalue of the Wishart matrix $HH^H$, $K_{min} = \min\{n_T, n_R\}$, $n_T$ denotes the number of the transmit antennas, and $n_R$ denote the number of the receive antennas.

The channel matrix H is expressed as the SVD form such as $H = U\Lambda V^H$, $U \in C^{n_R \times K_{min}}$ (C denotes the complex field) is satisfied, and $V^H \in C^{K_{min} \times n_T}$ denote the unitary matrices as mentioned above.

Herein, the matrix $\Lambda$ is the diagonal matrix including the eigenvalues of the matrix $HH^H$ in the diagonal, where H denotes the channel matrix and $H^H$ denotes the transpose conjugate matrix as described above.

When the precoding and the decoding are completed, the MIMO antenna 110 forwards the precoded and decoded transmit signals to the destination (S230).

So far, to reduce the precoding/decoding complexity, the method for precoding and decoding the distributive MIMO channel in the relay-based DF cooperative wireless network using the EVD based on the properties of the Jacket transformation has been illustrated.

As set forth above, by reducing the complexity for the information relay in the relay-based DF cooperative wireless network, the information can be delivered fast.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method performed by a relay node in a wireless network, comprising:
   receiving transmit signals from a source;
   precoding and decoding the transmit signals; and
   transmitting the precoded and decoded transmit signals to a destination by way of an antenna,
   wherein the precoding and decoding employs a channel matrix $H_{sj} = I_{N_{T1}} \otimes B_2$,
   where $I_{N_{T1}}$ denotes an $N_{T1} \times N_{T1}$ identity matrix, $\otimes$ denotes the Kronecker product, and $B_2$ is expressed as:

$$B_2 = J_2 \Lambda_2 J_2^{-1}$$

$$J_2 = \begin{bmatrix} -h_{sjQ} & -jh_{sjQ} \\ -jh_{sjQ} & -h_{sjQ} \end{bmatrix}$$

$$\Lambda_2 = \begin{bmatrix} h_{sjI} \pm jh_{sjQ} & 0 \\ 0 & h_{sjI} \mp jh_{sjQ} \end{bmatrix},$$

and
where:
   J denotes a jacket matrix;
   $h_{sjQ}$ denotes a quadrature, imaginary part, of a complex channel gain from the source to a j-th relay; and
   $h_{sjI}$ denotes an in-phase, real part, of the complex channel gain from the source to the j-th relay.

2. The communication method of claim 1, wherein $I_{N_{T1}} = J_{N_{T1}} \Lambda_{N_{T1}} J_{N_{T1}}^{-1}$.

3. The communication method of claim 1, wherein $H_{sj}$ is diagonally decomposed as follows:
$$H_{sj} = I_{N_{T1}} \otimes B_2 = I_{N_{T1}} \otimes (J_2 \Lambda_2 J_2^{-1}) = (I_{N_{T1}} \otimes J_2)(I_{N_{T1}} \otimes \Lambda_2)(I_{N_{T1}} \otimes J_2^{-1}) = J\Lambda J^{-1}.$$

4. The communication method of claim 1, wherein $H_{sj} = J\Lambda J^{-1}$.

5. The communication method of claim 4, wherein $$J = I_{N_{T_1}} \otimes J_2 = \begin{bmatrix} J_2 & \cdots & 0 \\ \vdots & \ddots & \vdots \\ 0 & \cdots & J_2 \end{bmatrix}_{2N_{T_1} \times 2N_{T_1}}.$$

6. The communication method of claim 4, wherein $$\Lambda = I_{N_{T_1}} \otimes \Lambda_2 = \begin{bmatrix} \Lambda_2 & \cdots & 0 \\ \vdots & \ddots & \vdots \\ 0 & \cdots & \Lambda_2 \end{bmatrix}_{2N_{T_1} \times 2N_{T_1}}.$$

7. The communication method of claim 4, wherein $$J^{-1} = I_{N_{T_1}} \otimes J_2^{-1} = \begin{bmatrix} J_2^{-1} & \cdots & 0 \\ \vdots & \ddots & \vdots \\ 0 & \cdots & J_2^{-1} \end{bmatrix}_{2N_{T_1} \times 2N_{T_1}}.$$

8. A relay node in a wireless network comprising:
   an antenna for receiving transmit signals to and from a source; and a precoder/decoder for precoding and decoding the transmit signals received via the antenna, and forwarding the precoded and decoded transmit signals to a destination via the antenna, wherein the precoder/decoder, for the precoding and decoding, employs a channel matrix $H_{sj} = I_{N_{T1}} \otimes B_2$, where $I_{N_{T1}}$ denotes an $N_{T_1} \times N_{T_1}$ identity matrix, $\otimes$ denotes the Kronecker product, and $B_2$ is expressed as:

$$B_2 = J_2 \Lambda_2 J_2^{-1}$$

$$J_2 = \begin{bmatrix} -h_{sjQ} & -jh_{shQ} \\ -jh_{sjQ} & -h_{sjQ} \end{bmatrix}$$

$$\Lambda_2 = \begin{bmatrix} h_{sjI} \pm jh_{sjQ} & 0 \\ 0 & h_{sjI} \mp jh_{sjQ} \end{bmatrix},$$

and
where:
  J denotes a jacket matrix;
  $h_{sjQ}$ denotes a quadrature, imaginary part, of a complex channel gain from the source to a j-th relay; and
  $h_{sjI}$ denotes an in-phase, real part, of the complex channel gain from the source to the j-th relay.

* * * * *